(12) United States Patent
Nishimoto (10) Patent No.: US 7,069,359 B1
(45) Date of Patent: Jun. 27, 2006

(54) CIRCUIT AND TECHNIQUE TO STALL THE COMMUNICATION OF DATA OVER A DOUBLE PUMPED BUS

(75) Inventor: Steve Nishimoto, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 09/541,780

(22) Filed: Apr. 3, 2000

(51) Int. Cl.
*G06F 13/00* (2006.01)
*H03L 7/00* (2006.01)

(52) U.S. Cl. .................. 710/100; 710/305; 713/322; 327/154

(58) Field of Classification Search ................ 713/322, 713/400; 327/141, 154
See application file for complete search history.

(56) References Cited

U.S. PATENT DOCUMENTS 5,994,931 A * 11/1999 Heinen et al. ............. 327/141
6,049,883 A * 4/2000 Tjandrasuwita ............ 713/322
6,247,134 B1 * 6/2001 Sproch et al. .............. 703/18

\* cited by examiner

*Primary Examiner*—Rehana Perveen
*Assistant Examiner*—Christopher E. Lee
(74) *Attorney, Agent, or Firm*—Trop, Pruner & Hu, P.C.

(57) ABSTRACT

An apparatus includes a first circuit and a second circuit. The first circuit receives indications of first data that is associated with a first data set and second data that is associated with a second data set. The second circuit is coupled to the first circuit to cause the first circuit to in a first mode, communicate indications of the first data to an output terminal in synchronization with a first phase of a clock signal and communicate indications of the second data to the output terminal in synchronization with a second phase of the clock signal. In a second mode, the second circuit causes the first circuit to communicate the indications of the first data to the output terminal in synchronization with the first phase and prevent communication of the second data during the second phase.

19 Claims, 5 Drawing Sheets

CIRCUIT AND TECHNIQUE TO STALL THE COMMUNICATION OF DATA OVER A DOUBLE PUMPED BUS

BACKGROUND

The invention relates to a circuit and technique to stall the communication of data over a double pumped bus.

As the performance of microprocessors advance, so does the complexity of their designs. As a result of this complexity, more conductive traces, or wires, may be present to route signals across the semiconductor die on which the microprocessor is fabricated. However, it is possible there may be more signals to be routed than there is room in the die to accommodate the corresponding wires.

One solution to this dilemma is to reduce the number of wires that are used to communicate different sets of data. One such arrangement is a double pumped bus, an arrangement in which data is communicated across a single wire in a time multiplexed fashion. Thus, one set of data (that is associated with a particular circuit) is communicated during time slots that are interleaved with other time slots that are used to communicate another set of data (that is associated with another circuit). In this manner, with a double pumped bus, bits from one set of data are communicated to the wire in synchronization with one phase of a clock signal, and bits from another set of data are communicated in synchronization with another phase of the clock signal. For example, one set of data may be communicated across the wire in response to the positive edges (i.e., the rising edges having positive slopes) of a clock signal, and another set of data may be communicated across the wire in response to the negative edges (i.e., the falling edges having negative slopes) of the clock signal.

Figure 1:
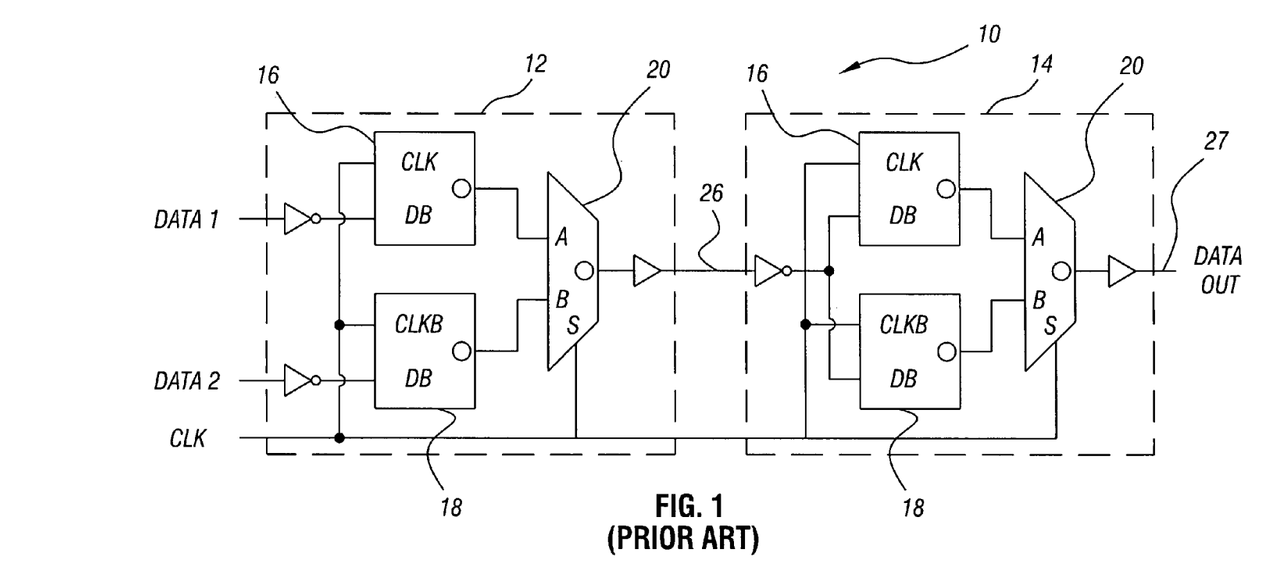
FIGS. 1 and 2 are schematic diagrams of double pumped bus systems of the prior art.

As a more specific example, FIG. 1 depicts a double pumped bus system 10 to communicate bits of data across a wire 26 between two double pumped bus cells 12 and 14. It is assumed that the cells 12 and 14 share a common ground. As an example, during the logic zero states of a clock signal (called CLK), the cell 12 drives a signal on the wire 26 so that the signal indicates bits of data from a first data set, and during the logic one states of the CLK signal, the cell 12 drives the signal on the wire 26 so that the signal indicates bits of data from a second data set. The cell 14 decodes the bits of data that are indicated by the signal on the wire 26 and may retransmit the bits of data in a time multiplexed fashion by driving a signal on another wire 27 in a manner similar to that described above. It is noted that, as described below, the cell 14 may be replicated for purposes of forming a larger double pumped system that communicates bits of data over several wires in synchronization with the CLK signal.

As an example, the cell 12 may include a bit latch 16 to latch and temporarily store bits of data from a first set of data and another bit latch 18 to temporarily store bits of data from a second set of data. In this manner, the input terminal of the bit latch 16 may receive a signal (called DATA1) that indicates the bits of the first data set, and the input terminal of the bit latch 18 may receive a signal (called DATA2) that indicates the bits of the second data set. The bit latch 18 is connected to latch bits in response to the positive edges of the CLK signal, and the bit latch 16 is connected to latch bits in response to the negative edges of the CLK signal.

Due to this arrangement, the bit latch 16 responds to each negative edge of the CLK signal by latching the DATA1 signal to store a new bit of the first data set. During the logic zero state of the clock of the CLK signal, the bit latch 16 furnishes a signal (at its non-inverted output terminal) that indicates its stored bit. The bit latch 18 responds to each positive edge of the CLK signal by latching the DATA2 signal to store a new bit of the second data set. During the logic one state of the CLK signal, the bit latch 18 furnishes a signal (at its non-inverted output terminal) that indicates its stored bit.

A multiplexer 20 of the cell 12 selects the output terminals of the bit latches 16 and 18 in response to the above-described logical states of the CLK signal to furnish the bits to the wire 26. As a result, the signal that is furnished by the multiplexer 20 indicates the bits from the first and second data sets in a time multiplexed fashion. It is noted that the cell 14 may have a similar design to the cell 12 except that the input terminals of the bit latches 16 and 18 of the cell 14 are connected together to receive the same signal from the wire 26. Because the bit latch 18 of the cell 14 latches in response to the positive edges of the CLK signal and the bit latch 16 of the cell 14 latches in response to the negative edges of the CLK signal, the bit latches 16 and 18 latch the signal from the wire 26 in alternating time slices to de-multiplex the data. The cell 14 places the bits back into the time multiplexed order for purposes of transmitting the bits across the other wire 27.

Figure 2:
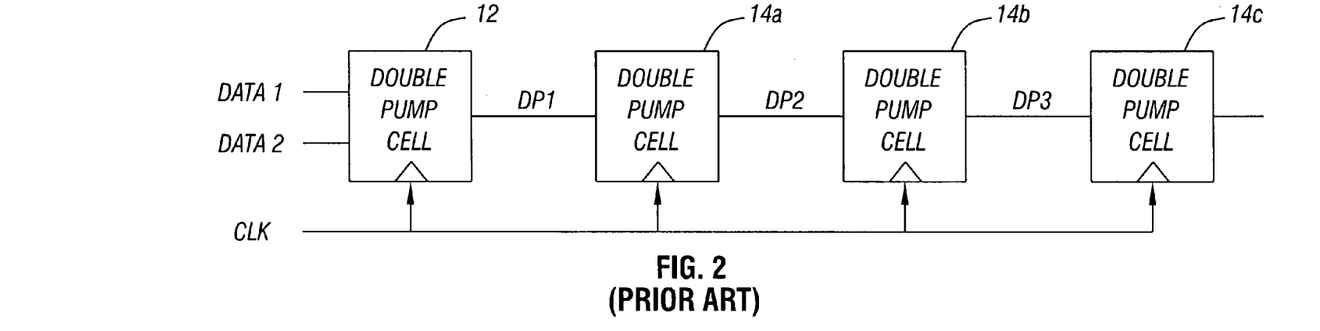
Figure 3:
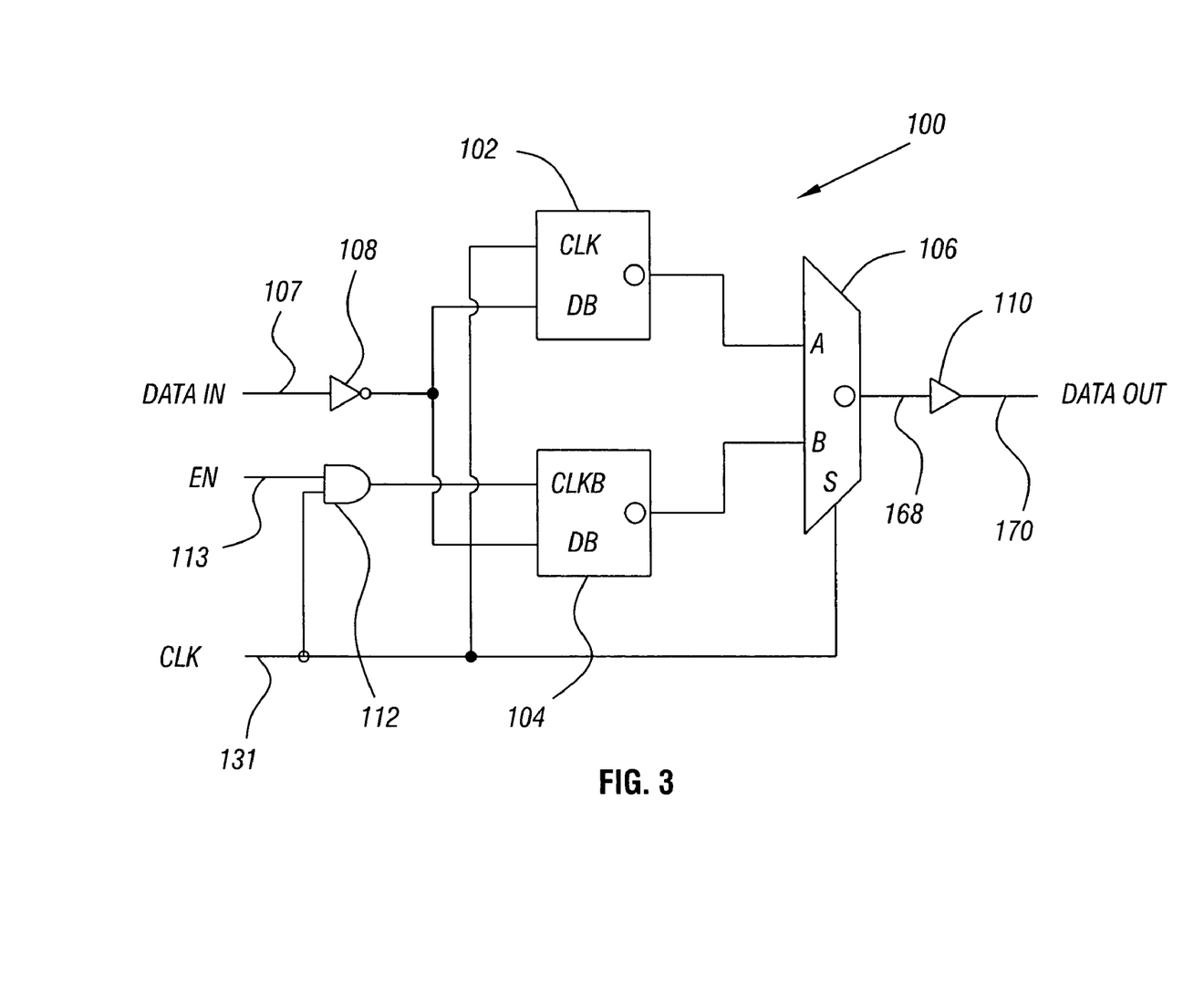
FIG. 3 depicts waveforms illustrating signals of the double pumped bus system of FIG. 2.

Referring to FIG. 2, several cells 12 and 14 (cells 14a, 14b and 14c, as examples) may be serially coupled together to from a chain to relay data between the cells 14 using the double pumped technique that is described above. In this manner, the cell 12 is the first in the chain, and the cells 14 precede the cell 12 in the chain. As an example, FIG. 3 depicts signals called DP1, DP2 and DP3 that are furnished by the cells 12, 14a and 14b, respectively, and illustrate the propagation of data bits between the cells 12 and 14. For example, referring to FIG. 3, the CLK signal has a negative edge at time $T_1$, and in response to this negative edge, the cell 12 latches a bit (represented by the portion 50 of the DATA1 signal) for the first data set. At time $T_2$, the CLK signal has a positive edge, an edge that causes the cell 12 to latch a bit (represented by the portion 52 of the DATA2 signal) for the second data set. After time $T_1$ during the logic zero state of the CLK signal, the cell 12 begins furnishing the bit 50 to the cell 14a. It is noted that the bit 50 may not appear until after a slight propagation delay, as depicted in FIG. 3. After time $T_2$ during the logic one state of the CLK signal, the cell 12 begins furnishing the bit 52 to the cell 14a, as depicted in FIG. 3. The cells 14a and 14b then relay the bits 50 and 52 in a time multiplexed fashion.

Unfortunately, the above-described cells only accommodate free flowing data. In this manner, the conventional double pumped bus cell does not have the capability to selectively block the flow of bits from a particular data set.

Thus, there is a continuing need for an arrangement that addresses one or more of the problems that are stated above.

BRIEF DESCRIPTION OF THE DRAWING

FIGS. 4 and 6 are schematic diagrams of double pumped bus cells according to embodiments of the invention.

DETAILED DESCRIPTION

Referring to FIG. 3, an embodiment 100 of a double pumped bus cell in accordance with the invention may be set up to communicate either one or two sets of data. More specifically, in some embodiments of the invention, an EN signal that is received by the cell 100 may be asserted (driven high, for example) to enable the cell 100 to latch, store and retransmit bits of data from two different data sets in a time multiplexed fashion. In this manner, a data line 107 communicates a signal (called DATAIN) that indicates bits of data from a first data set and a second data set. The bits of the first data set are interleaved, or alternate, in time with the bits of the second data set.

In some embodiments of the invention, when the EN signal is asserted, a bit latch 102 of the cell 100 latches bit one at a time (from the data input line 107) from a first data set in response to the negative edges of a clock signal (called CLK), and another bit latch 104 of the cell 100 latches bits one at a time (also from the data input line 107) from a second data set in response to the positive edges of the CLK signal. The bit latch 102 provides an indication of its latched bit during the logic zero state of the CLK signal, and the bit latch 104 provides an indication of its latched bit during the logic one state of the CLK signal. The select terminal of a multiplexer 106 of the cell 100 receives the CLK signal, selects the output terminal of the bit latch 102 during the logic zero state of the CLK signal and selects the output terminal of the bit latch 104 during the logic one state of the CLK signal. The output terminal of the multiplexer 106 is coupled (via a signal buffer 110) to an output terminal 170 of the cell 100. Thus, due to this arrangement, the cell 100 furnishes the bits of the first and second data sets in a time multiplexed fashion to the output terminal 170 that may be coupled to a double pumped bus wire, for example.

It is noted that, at least in some embodiments of the invention, the cell 100 receives bits from the first data set during the logic one states of the CLK signal, latches these bits in response to the negative edges of the CLK signal and furnishes these bits to the output terminal 170 during the logic zero states of the CLK signal. The cell 100 receives bits from the second data set during the logic zero states of the CLK signal, latches these bits in response to the positive edges of the CLK signal and furnishes these bits to the output terminal 170 during the logic one states of the CLK signal. Thus, the cell 100 reverses the phases between the incoming and outgoing data streams.

It is possible that in a particular scenario, it may not be desirable to communicate both sets of data through the cell 100. For example, in some embodiments, the EN signal may be de-asserted (driven low, for example) to disable the bit latch 104 from latching new bits of data (from the second data set) from the data input line 107. Thus, by disabling the bit latch's ability to receive bit updates, the flow of the second set of data may be effectively halted through the cell 100.

Thus, the double pumped cell 100 may be used in at least two ways. In a chain of double pumped cells, the EN signal may be asserted in each of the cells to enable the communication of both sets of data through the chain. As described above, in some embodiments of the invention, the operation of the bit latch 102 is not affected by the EN signal, as the bit latch 102 responds to the CLK signal, regardless of the state of the EN signal. When the EN signal is asserted for a particular cell 100, both sets of data propagate though the bit latches 102 and 104. Thus, as an example, a particular bit propagates through the bit latch 102 of one cell in the chain, propagates through the bit latch 104 of the next cell in the chain, propagates through the bit latch 102 of the next cell in the chain, etc. The double pumped cell 100 may also be used in the chain to filter out the communication of one of the sets of data through the chain. For this arrangement, the EN signal is deasserted in every other cell to alternate which bit latch 102, 104 is disabled, as bits of a particular data set alternate between the bit latches 102 and 104 as the data propagates through the chain.

To accomplish the above-described features, in some embodiments of the invention, the cell 100 may include logic, such as an AND gate 112, that receives the CLK and EN signals. The output terminal of the AND gate 112 is coupled to the inverting clock input terminal of the bit latch 104, and the clock input terminal of the bit latch 102 receives the CLK signal. Because the bit latches 102 and 104, in some embodiments of the invention, invert the logic levels of the stored bits, the cell 100 may include an inverter 108 that is coupled between the data input line 107 and the input terminals of the bit latches 102 and 104. When the EN signal is de-asserted, the output terminal of the AND gate 112 is de-asserted, regardless of the logic level of the CLK signal, and thus, the bit latch 104 does not store any new data as long as the EN signal remains de-asserted. However, when the CLK signal is asserted, the CLK signal controls the signal at the output terminal of the AND gate 112 and thus, controls the reception of data into the bit latch 104.

Figure 4:
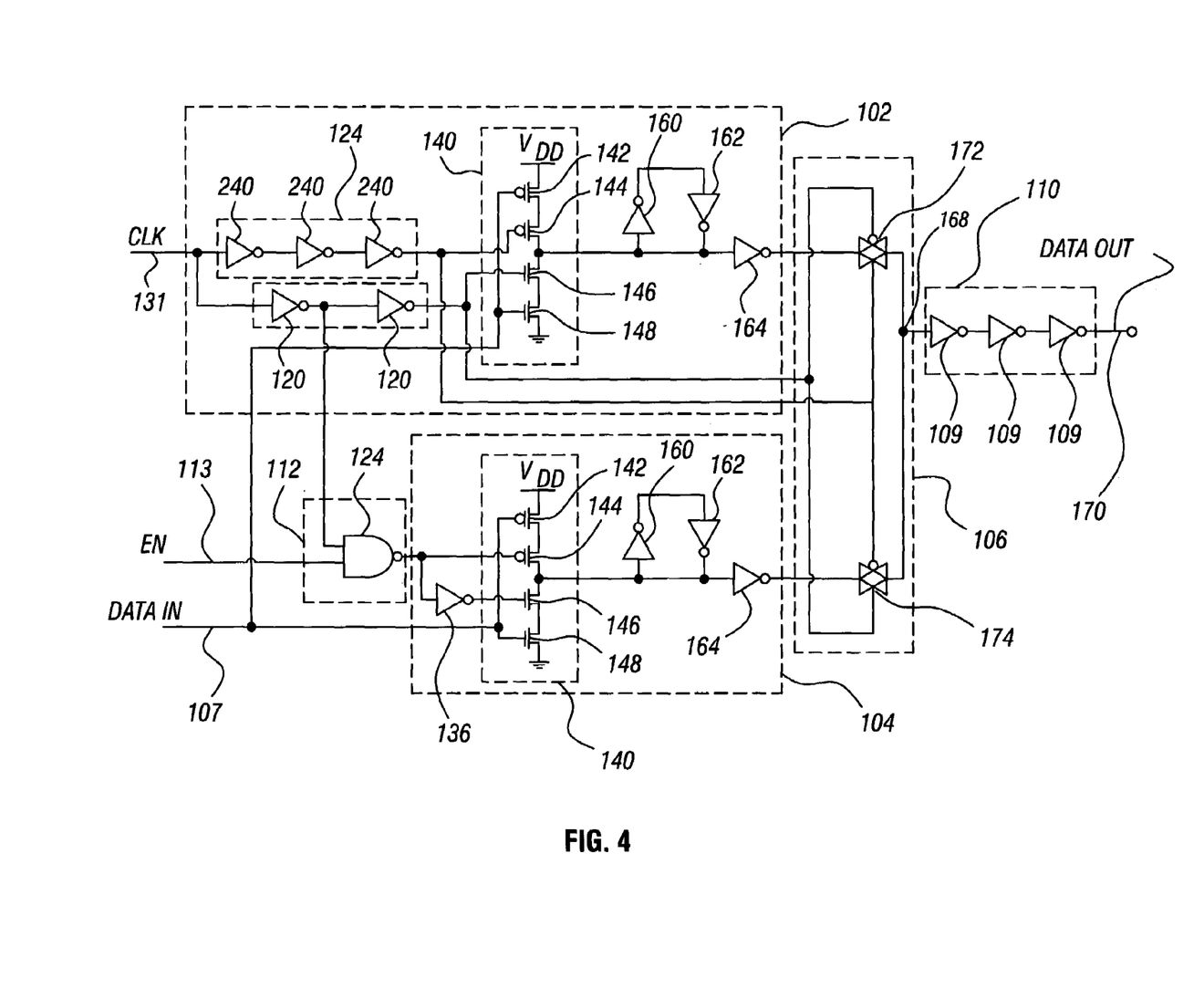

FIG. 4 depicts a more detailed schematic diagram of the cell 100 in accordance with some embodiments of the invention. As shown, the bit latch 102 may include a circuit 140 that is effectively a complementary metal oxide semiconductor (CMOS) inverter that is enabled when the CLK signal (that alternates between logic one and logic zero states) is in a logic one state to latch the bit that is indicated by the DATAIN signal. To accomplish this, the circuit 140 includes an n-channel metal-oxide-semiconductor field-effect-transistor (NMOSFET) 148 that has its source terminal coupled to ground and its drain terminal coupled to the source terminal of another NMOSFET 146. The drain terminal of the NMOSFET 146 is coupled to the drain terminal of a p-channel metal-oxide-semiconductor field-effect-transistor (PMOSFET) 144. The source terminal of the PMOSFET 144 is coupled to the drain terminal of another PMOSFET 142, and the drain terminal of the PMOSFET 142 is coupled to a positive voltage supply level (called $V_{DD}$). The gate terminals of the PMOSFET 144 and the NMOSFET 146 respond to the logical stage of the CLK signal to control when the circuit 140 is enabled. In this manner, the gate terminal of the PMOSFET 144 is coupled to a clock input terminal 131 (that furnishes the CLK signal) via a chain 124 of three serially coupled inverters 240 that invert the CLK signal to receive an inverted version of the CLK signal. The gate terminal of the NMOSFET 146 is coupled to a chain 123 of serially coupled inverters 120 to the clock line 131 to receive an indication of the CLK signal. The gate terminals of the PMOSFET 142 and the NMOSFET 148 are coupled to the data input line 107.

For purposes of storing the bit inside the bit latch 102, the buffer 102 includes a latch circuit that is formed by two inverters 160 and 162 that are coupled together in a back-to-back arrangement. The input terminal of the inverter 160 and the output terminal of the inverter 162 are coupled together to the drain terminal of the NMOSFET 146. An inverter 164 is coupled between the drain terminal of the NMOSFET 146 and the multiplexer 106. Thus due to this arrangement, when the circuit 140 is enabled during the logic one state of the CLK signal, the CMOS inverter (formed by the transistors 142, 144, 146 and 148) drives the inverters 160 and 162 to update the state of the stored bit, and when the CLK signal transitions from the logic one to the logic zero state on a negative edge, the CMOS inverter becomes disabled to latch the bit that is stored in the inverters 160 and 162.

Similar to the bit latch 102, the bit latch 104 includes the circuit 140 and the bit latch that is formed from inverters 160 and 162. However, unlike the bit latch 102, the gate terminals of the circuit 140 of the bit latch 104 are connected differently. In this manner, the gate terminal of the PMOSFET 144 is coupled to the output terminal of a NAND gate 124, and the gate terminal of the NMOSFET 146 is coupled to the output terminal of an inverter 136 that has its input terminal coupled to the output terminal of the NAND gate 124. One input terminal of the NAND gate 124 is coupled between the inverter 120 to receive an inverted indication of the CLK signal, and the output input terminal of the NAND gate 124 is coupled to an enable input line 113 to receive the EN signal. Thus, when the EN signal is asserted, the circuit 140 of the bit latch 104 is enabled during the logic zero state of the CLK signal to update the bit that is stored by the inverters 160 and 162 of the circuit 104. During the logic one state of the CLK signal and when the EN signal is de-asserted, the circuit 140 is disabled. Thus, when the CLK signal transitions from the logic zero to the logic one state on a positive edge, the CMOS inverter becomes disabled to latch the bit that is stored in the inverters 160 and 162 of the bit latch 104.

In some embodiments of the invention, the multiplexer 106 includes two CMOS pass gates 172 and 174. The input terminal of the CMOS pass gate 172 is coupled to the output terminal of the inverter 164 of the bit latch 102, and the output terminal of the CMOS pass gate 172 is coupled to a node 168 that forms the output terminal of the multiplexer 106. The inverting control, or selection, terminal of the pass gate 172 is coupled to the gate terminal of the NMOSFET 146 of the bit latch 102, and the non-inverting control, or selection, terminal of the pass gate 172 is coupled to the gate terminal of the PMOSFET 144 of the bit latch 102. Thus, due to this arrangement, the output terminal of the bit latch 102 is coupled to the output terminal of the multiplexer 106 when the CLK signal has a logic zero level. The input terminal of the CMOS pass gate 174 is coupled to the output terminal of the inverter 164 of the bit latch 104, and the output terminal of the CMOS pass gate 174 is coupled to the node 168. The inverting control terminal of the pass gate 174 is coupled to the non-inverting control terminal of the pass gate 172, and the non-inverting control terminal of the pass gate 174 is coupled to the inverting control terminal of the pass gate 172. Thus, due to this arrangement, the output terminal of the bit latch 104 is coupled to the output terminal of the multiplexer 106 when the CLK signal has a logic one level. In some embodiments of the invention, the inverter 110 may include a chain of three inverters 109 that are coupled between the node 168 and the output terminal 170.

Figure 5:
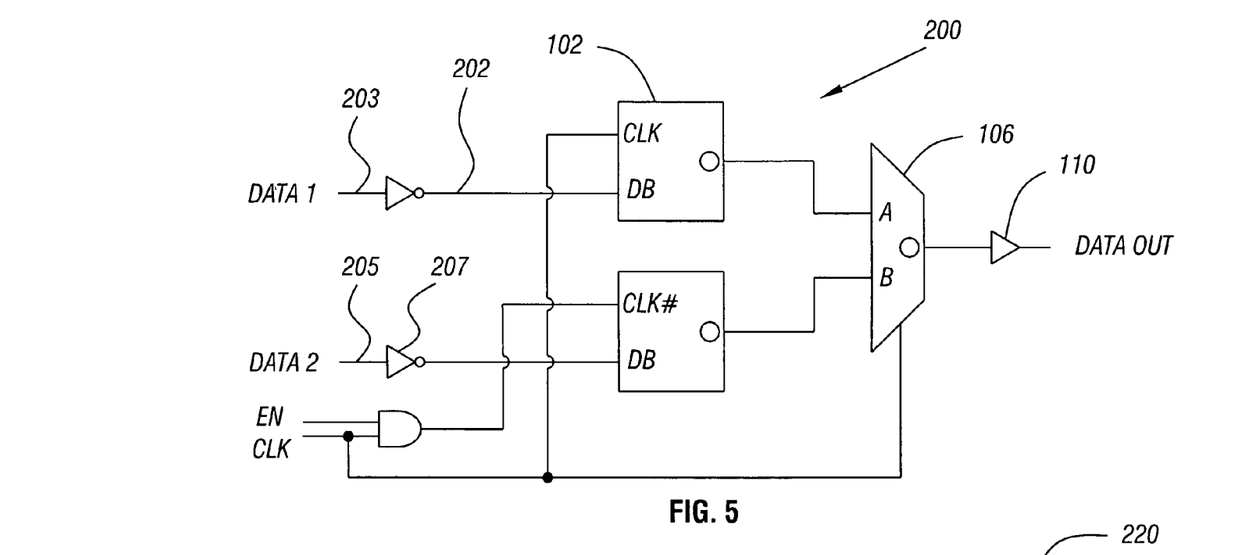
FIG. 5 is a more detailed schematic diagram of the cell of FIG. 4 according to an embodiment of the invention.

The cell 100 that is described above receives time-multiplexed bits of data from a single wire. However, in some embodiments of the invention, a cell 200 that is depicted in FIG. 5 may be used in place of the cell 100. The cell 200 has a similar design to the cell 100 except for the following features. Unlike the cell 100, the cell 200 has two data input lines 203 and 205 (instead of one) to receive bits of data from circuits that are associated with two different data sets. In this manner, the inverter 108 (see FIG. 3) of the cell 100 is replaced by two inverters 202 and 207 of the circuit 200. The input terminal of the inverter 202 receives a signal (called DATA1) that is indicative of bits of data from the first data set, and the input terminal of the inverter 207 receives a signal (called DATA2) that is indicative of bits of data from the second data set. The output terminal of the inverter 202 is coupled to the data input line of the bit latch 102, and the output terminal of the inverter 207 is coupled to the data input line of the bit latch 104.

Figure 6:
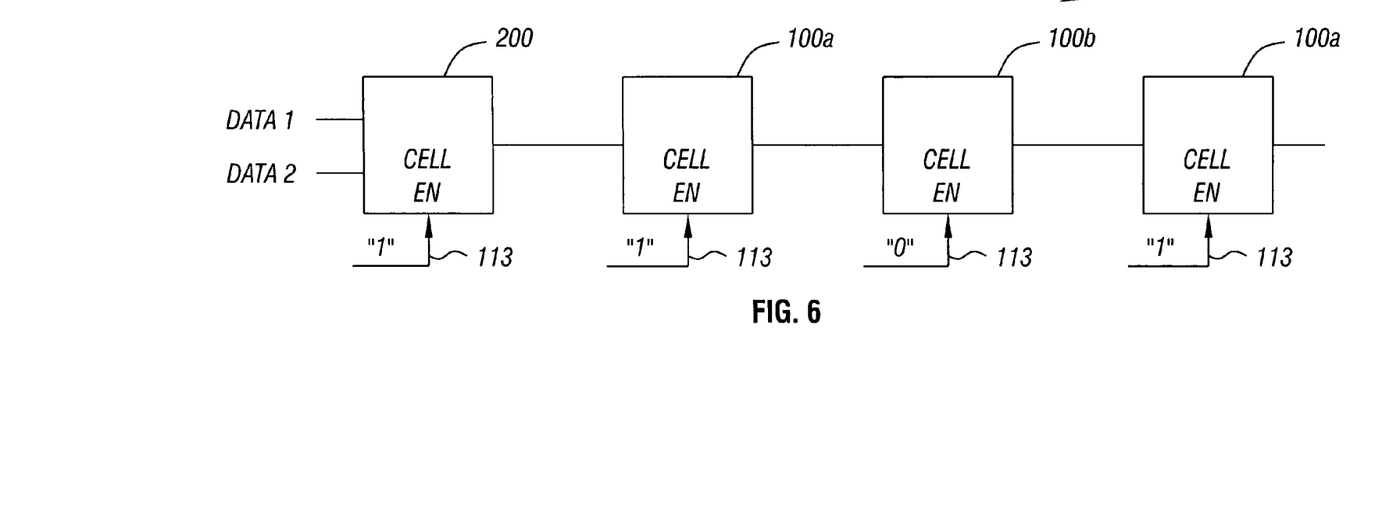
FIG. 6 is a schematic diagram of a double pumped bus cell system according to an embodiment of the invention.

Referring to FIG. 6, in some embodiments of the invention, the cells 100 (the enabled cells 100*a* and the disabled cells 100*b*, as described below) and 200 may be used to form a double pumped bus chain 220 for purposes of communicating the bits of data from the first and second data sets across an integrated circuit, for example. In this manner, the cell 200 is the first in the chain 220 to arrange bits from the two different data sets in a time interleaved fashion. The cells 100 may be serially coupled together after the cell 200. As shown, to disable the flow of the bits of the data set that is associated with the DATA2 signal, every other cell 100 is disabled, as depicted in FIG. 6 by the enabled cells 100*a* and the disabled cells 100*b*. This alternative disabling of the cells 100 occurs because each cell 100 reverses the phasing of the data flow. For example, each cell 100 receives the bits of a particular data set on positive clock edges and retransmits the bits of that data set on negative clock edges. The arrangement that is depicted in FIG. 6 is used to disable the flow of bits for the data set that is associated with the DATA2 signal. However, alternatively, to disable the bits for the data set that is associated with the DATA1 signal, the enable input terminals 113 of the cells 200 and 100b are asserted, and the enable input terminals 113 of the cells 100a are de-asserted.

Figure 7:
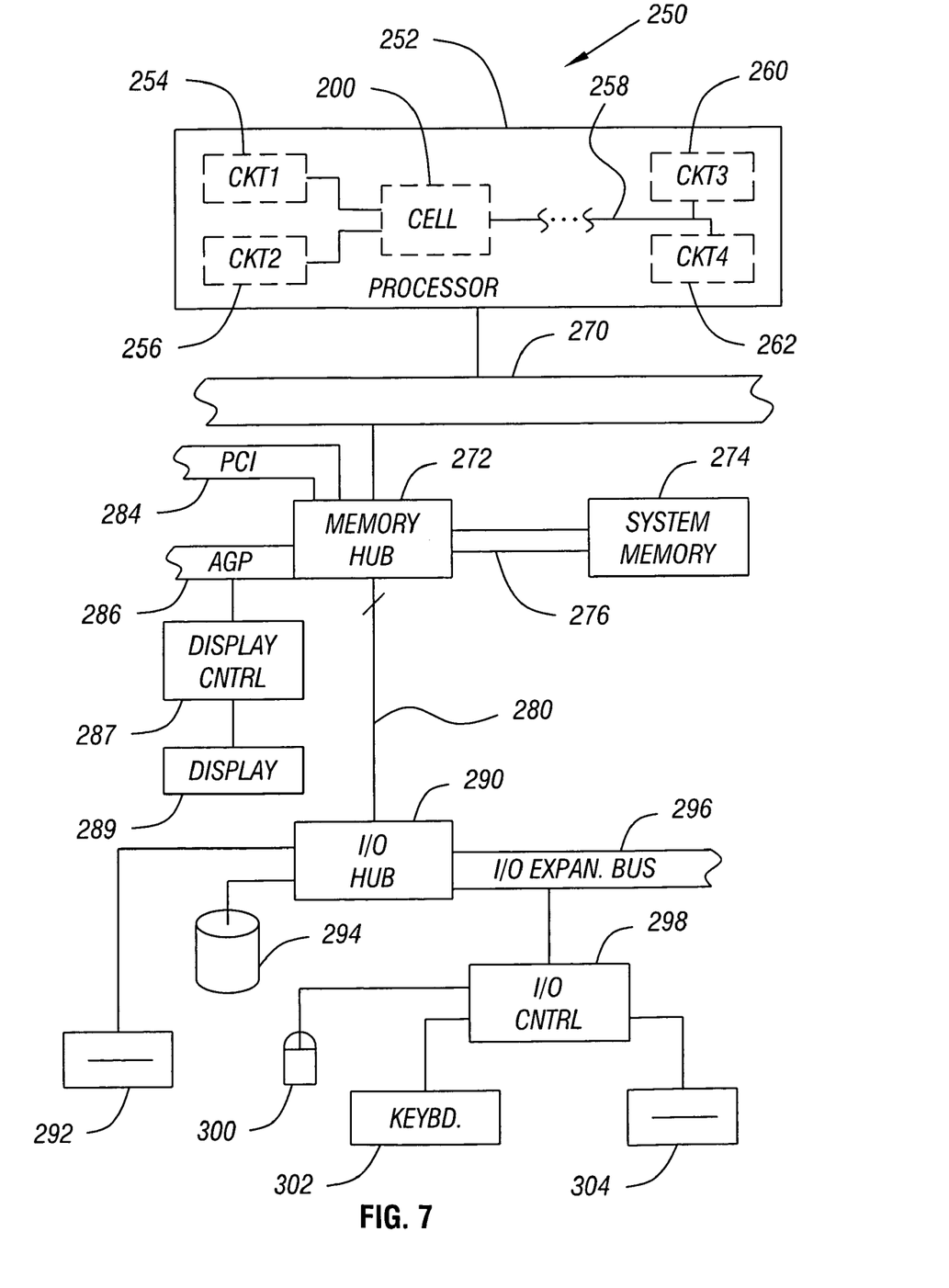
FIG. 7 is a schematic diagram of a computer system according to an embodiment of the invention.

Referring to FIG. 7, as an example, the cell 200 (and/or the cell 100) may be used in a semiconductor circuit, such as a processor 252 (a microprocessor, such as a Pentium® microprocessor, as an example), to communicate bits of data between circuits 254, 256, 260 and 262 of the processor 252. In this manner, the cell 200 may communicate data over a wire 258 for two data sets. More specifically, the cell 200 may communicate data for a first data set between the circuit 254 that is located at one end of the wire 258 and the circuit 260 that is located at another end of the wire 268. The cell 200 may also communicate data for a second data set between the circuit 256 that is located at one end of the wire 258 and the circuit 262 that is located at the other end of the wire 268.

Among the other components of the computer system 250, the computer system 250 may include a local bus 270 that is coupled to the processor 252 and is also coupled to a north bridge, or memory hub 272. As an example, the memory hub 272 may provide interfaces for a Peripheral Component Interface (PCI) bus 284, an Accelerated Graphics Port (AGP) bus 286 and a memory bus 276. The AGP is described in detail in the Accelerated Graphics Port Interface Specification, Revision 1.0, published on Jul. 31, 1996, by Intel Corporation of Santa Clara, Calif. The PCI Specification is available from The PCI Special Interest Group, Portland, Oreg. 97214. The memory bus 276 communicates data between the memory hub 272 and a system memory 274. A display controller 287 may be coupled the AGP bus 286 and drive a display 289. A hub bus 289 may establish communication between the memory hub 272 and a south bridge, or input/output (I/O) hub 290.

The I/O hub 290 may, for example, control operation of a CD-ROM drive 292 and a hard disk drive 294. The I/O hub 290 may also provide an interface to an I/O expansion bus 296. An I/O controller 298 may be coupled to the I/O expansion bus 296. The I/O controller 298 may, for example, receive input data from a mouse 300 and a keyboard 302 and control operation of a floppy disk drive 304. The computer system 250 is one out of many different embodiments, all of which are within the scope of the appended claims.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An apparatus comprising:
   a first circuit to receive indications of first data associated with a first data set and second data associated with a second data set; and
   a second circuit coupled to the first circuit to cause the first circuit to:
   in a first mode, communicate indications of the first data to an output terminal in synchronization with a first phase of a clock signal and communicate indications of the second data to the output terminal in synchronization with a second phase of the clock signal, and
   in a second mode, communicate the indications of the first data to the output terminal in synchronization with the first phase and prevent communication of the second data during the second phase.

2. The apparatus of claim 1, wherein the first circuit comprises:
   a first latch to store at least one bit at a time of the first data; and
   a second latch to, at least in the first mode, store at least one bit at a time of the second data.

3. The apparatus of claim 2, wherein the first latch transfers said at least one bit of the first data in response to a predefined edge of the clock signal.

4. The apparatus of claim 2, wherein, in the first mode, the second latch transfers said at least one bit of the second data in response to a predefined edge of the clock signal.

5. The apparatus of claim 4, further comprising:
   logic to selectively provide the CLK signal to the second latch based on whether the apparatus is in the first or second mode.

6. The apparatus of claim 5, wherein the logic does not provide the clock signal to the second latch in the second mode.

7. The apparatus of claim 5, wherein the logic comprises:
   an AND gate including a first input terminal to receive a mode select signal, a second input terminal to receive the clock signal and an output terminal coupled to a clock input terminal of the second latch.

8. The apparatus of claim 2, further comprising:
   a multiplexer including an output terminal that is coupled to the output terminal of the apparatus, the multiplexer alternatively selecting the first and second latch in response to the first and second phases of the clock signal.

9. The apparatus of claim 1, wherein the apparatus comprises a double pumped bus circuit.

10. A computer system comprising:
    a system memory; and
    a processor coupled to system memory, the processor including:
    a wire;
    a first circuit to receive indications of first data associated with a first data set and second data associated with a second data set; and
    a second circuit coupled to the first circuit to cause the first circuit to:
    in a first mode, communicate indications of the first data to the wire in synchronization with a first phase of a clock signal and communicate indications of the second data to the wire in synchronization with a second phase of the clock signal, and
    in a second mode, communicate the indications of the first data to the wire in synchronization with the first phase and prevent communication of the second data during the second phase.

11. The computer system of claim 10, wherein the first circuit comprises:
    a first latch to store at least one bit at a time of the first data; and
    a second latch to, at least in the first mode, store at least one bit at a time of the second data.

12. The computer system of claim 11, wherein the first latch transfers said at least one bit of the first data in response to a predefined edge of the clock signal.

13. The computer system of claim 11, wherein, in the first mode, the second latch transfers said at least one bit of the second data in response to a predefined edge of the clock signal.

14. The computer system of claim 13, further comprising:
logic to selectively provide the clock signal to the second latch based on whether the apparatus is in the first or second mode.

15. The system comprising: double pumped bus circuits serially coupled together to form a chain to communicate data from at least two different sets of data, at least one of the bus circuits being capable of being disabled to prevent bits from at least one of the sets of data from being communicated through said at least one of the bus circuits, wherein alternate double pumped circuits are disabled to prevent the bits from at least one of the sets of data from being communicated through said at least one of the bus circuits.

16. A method comprising:
receiving first indications of first data associated with a first data set;
receiving second indications of second data associated with a second data set;
in a first mode, communicating the first indications to a double pumped bus in synchronization with a first phase of a clock signal and communicating the second indications to the double pumped bus in synchronization with a second phase of the clock signal; and
in a second mode, communicating the first indications to the double pumped bus in synchronization with the first phase and preventing communication of the second indications to the double pumped bus during the second phase.

17. The method of claim 16, wherein the receiving the first indications comprises:
latching the first indications one bit at a time.

18. The method of claim 16, wherein the receiving the second indications comprises:
latching the second indications one bit at a time in response to the first mode.

19. The method of claim 16, wherein the communicating during the first mode comprises:
communicating bits of the first data in response to first predefined edges of the clock signal; and
communicating a bits of the second data in response to other predefined edges of the clock signal, said other predefined edges being different from the first predefined clock edges.

* * * * *

UNITED STATES PATENT AND TRADEMARK OFFICE
CERTIFICATE OF CORRECTION

| | | |
|---|---|---|
| PATENT NO. | : 7,069,359 B1 | |
| APPLICATION NO. | : 10/772755 | |
| DATED | : June 27, 2006 | |
| INVENTOR(S) | : Steve Nishimoto | |

It is certified that error appears in the above-identified patent and that said Letters Patent is hereby corrected as shown below:

Column 8, line 24, "CLK" should be --clock--.

Signed and Sealed this

Twelfth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,069,359 B1
APPLICATION NO. : 09/541780
DATED : June 27, 2006
INVENTOR(S) : Steve Nishimoto It is certified that error appears in the above-identified patent and that said Letters Patent is hereby corrected as shown below:

Column 8, line 24 Claim 5, "CLK" should be --clock--.

Signed and Sealed this

Fifth Day of February, 2008

JON W. DUDAS
*Director of the United States Patent and Trademark Office*